United States Patent [19]

Brunson et al.

[11] Patent Number: 5,232,671
[45] Date of Patent: Aug. 3, 1993

[54] CORE FOR A CATALYTIC CONVERTER

[75] Inventors: Gordon W. Brunson, Chagrin Falls; Richard C. Cornelison, Hiram, both of Ohio

[73] Assignee: W. R. Grace & Co.-Conn., New York, N.Y.

[21] Appl. No.: 826,488

[22] Filed: Jan. 27, 1992

[51] Int. Cl.[5] ............................................. F01N 3/28
[52] U.S. Cl. ..................................... 422/174; 422/177; 422/180; 422/199; 422/222; 60/300; 60/303; 55/DIG. 30
[58] Field of Search ............... 422/173, 174, 177, 180, 422/199, 211, 222; 60/299, 300, 303; 55/DIG. 30

[56] References Cited

U.S. PATENT DOCUMENTS

| | | | |
|---|---|---|---|
| 3,768,982 | 10/1973 | Kitzner et al. | 422/174 |
| 3,770,389 | 10/1973 | Kitzner et al. | 422/174 |
| 4,576,800 | 3/1986 | Retallick | 422/180 |
| 4,928,485 | 5/1990 | Whittenberger | 60/299 |
| 4,942,020 | 7/1990 | Whittenberger et al. | 422/180 |
| 4,976,929 | 12/1990 | Cornelison et al. | 422/174 |
| 5,070,694 | 12/1991 | Whittenberger | 60/300 |
| 5,118,475 | 6/1992 | Cornelison | 422/174 |
| 5,140,812 | 8/1992 | Cornelison et al. | 60/300 |

Primary Examiner—Lynn M. Kryza
Attorney, Agent, or Firm—Edward J. Cabic

[57] ABSTRACT

There is provided an improved electrically conductive metal honeycomb body having a plurality of corrugated thin metal strips, which may be heater strips, extending in electrical parallel between otherwise electrically isolated connector plates. The corrugated thin metal strips each have a flat central section. A first group of strips is gathered at their flat middle portions and bent around one of a pair of rigid central posts, and a second group of strips is gathered and bent in the opposite direction about the other of posts. Insulation in the form of a flexible woven ceramic fiber strip isolate the first and second groups from each other and from the central posts. The connector plates define a segmented retainer shell about the body. A battery is connected to the connector plates whereby current flows from one connector plate through corrugated thin metal strips to the other connector plate and back to the battery.

22 Claims, 4 Drawing Sheets

CORE FOR A CATALYTIC CONVERTER

This invention relates to a core for a catalytic converter and a catalytic converter containing same, and more particularly, to a honeycomb or polycellular core characterized by mechanical durability and resistance to catalytic deterioration. In specific embodiments of the invention, the core is electrically heatable although it is to be understood that these devices can be designed and used without being electrically heatable, for use, for example, in conducting various catalytic reactions. In the latter case, elements associated with electrical insulation and supplying electrical power may be omitted from the devices. The invention will, however, for convenience be described in connection with those embodiments which are electrically heatable.

BACKGROUND OF THE INVENTION AND PRIOR ART

The purpose of a catalytic converter for an internal combustion engine or a gas turbine is to convert pollutant materials in the exhaust, e.g., carbon monoxide, unburned hydrocarbons, nitrogen oxide, etc., to carbon dioxide, nitrogen and water. Conventional catalytic converters utilize a ceramic honeycomb monolith having square or triangular straight-through openings or cells with catalyst deposited on the walls of the cells; catalyst coated refractory metal oxide beads or pellets, e.g., alumina beads; or a corrugated thin metal foil honeycomb monolith, e.g., a ferritic stainless steel foil or a nickel alloy, having a catalyst carried on or supported on the surface. The catalyst is normally a noble metal, e.g., platinum, palladium, rhodium, ruthenium, or a mixture of two or more of such metals. Zeolite coatings may also be used for adsorption and desorption of the pollutants to aid in catalytic activity. The catalyst catalyzes a chemical reaction, mainly oxidation, whereby the pollutant is converted to a harmless by-product which then passes through the exhaust system to the atmosphere.

However, conversion to such harmless by-products is not efficient initially when the exhaust gases are relatively cold, e.g., at cold start. To be effective at a high conversion rate, the catalyst and the surface of the converter with which the gases come in contact must be at or above a minimum temperature, e.g., 390 F. for carbon monoxide, 570 F. for volatile organic compounds (VOC) and 1000 F. for methane or natural gas. Otherwise, conversion to harmless by-products is poor and cold start pollution of the atmosphere is high. Once the exhaust system has reached its normal operating temperature, the catalytic converter is optimally effective. Hence, it is necessary for the relatively cold exhaust gases to make contact with a hot catalyst so as to effect satisfactory conversion. Compression ignited engines, spark ignited engines and reactors in gas turbines have this need.

To achieve initial heating of the catalyst at or prior to engine start-up, there is conveniently provided an electrically heatable catalytic converter, preferably one formed of a thin metal honeycomb monolith, either spaced flat thin metal strips, straight corrugated thin metal strips, pattern corrugated thin metal strips, (e.g., herringbone or chevron corrugated) or variable pitch corrugated thin metal strips (See U.S. Pat. No. 4,810,588 dated Mar. 7, 1989 to Bullock et al), or a combination thereof, which monolith is connected to a voltage source, e.g., a 12 volt to 108 volt DC power supply, preferably at the time of engine start-up and afterwards to elevate and maintain the catalyst to at least 650 F. plus or minus 30 F. Alternatively, power may also be supplied for a few seconds prior to start-up of the engine. Catalytic converters containing a corrugated thin metal (stainless steel) monolith have been known since at least the early 1970's. See Kitzner U.S. Pat. Nos. 3,768,982 and 3,770,389 each dated Oct. 30, 1973. More recently, corrugated thin metal monoliths have been disclosed in U.S. Pat. No. 4,711,009 dated Dec. 8, 1987; U.S. Pat. No. 4,381,590 to Nonnenmann et al dated May 3, 1983, copending application U.S. Pat. Ser. No. 606,130 filed Oct. 31, 1990 by William A. Whittenberger and entitled Electrically Heatable Catalytic Converter and commonly owned with the present application now U.S. Pat. No. 5,070,694, and International PCT Publication Numbers WO 89/10470 (EP 412,086) and WO 89/10471 (EP 412,103) each filed Nov. 2, 1989, claiming a priority date of Apr. 25, 1988. The first two of the above International Publication Numbers disclose methods and apparatus for increasing the internal resistance by placing a series of spaced discs in series or electrically insulating intermediate layers. Another International PCT Publication Number is WO 90/12951 published Apr. 9, 1990 and claiming a priority date of Apr. 21, 1989 which seeks to improve axial strength by formlocking layers of insulated plates. Another reference which seeks to improve axial strength is the U.S. Pat. No. 5,055,275 dated Oct. 8, 1991 to Kannianen et al. However, a common problem with such prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at high temperature (between 800 and 950 C.; 1472 to 1742 F., respectively) with exhaust gas from a running internal combustion engine simultaneously being passed through the device. If the catalytic device telescopes or displays separation or folding over of the leading or upstream edges of the foil leaves up to a predetermined time, e.g., 5 to 200 hours, the device is said to fail the test. Usually, a device that lasts 5 hours will last 200 hours. Five hours is equivalent to 1.8 million cycles at 100 Hertz.

The Hot Cycling test is conducted at 800 to 950 C. (1472 to 1742 F.) and cycled to 120 to 150 C. once every 15 to 20 minutes, for 300 hours. Telescoping or separation of the leading edges of the foil strips is considered a failure.

The Hot Shake Test and the Hot Cycling Test, hereinafter called "Hot Tests", have proved very difficult to survive, and many efforts to provide a successful device have been either too costly or ineffective for a variety of reasons.

Previously tested samples of EHC's in automotive service and comprised entirely of heater strips in electrical parallel did not have adequate endurance in Hot Tests nor did they have sufficiently high resistance to fulfill the need for lower power ratings. In repeated efforts to arrive at a suitable design using purely parallel circuit construction, samples were made and tested with a wide range of parameters, including a length-to-diameter aspect ratio of from 0.5 to 1.5, cell densities of from 100 to 500 cells per square inch, individual strip heaters as long as 20 inches, and parallel circuits limited to as few as 2 to 4 heater strips.

Devices made according to these design parameters proved unsatisfactory in the Hot Tests because (a) terminal resistance was too low and, therefore, the devices drew too much power, (b) the relatively high voltage differential between laminations associated with small numbers of parallel heater strips caused some interlaminar arcing, and (c) Hot Tests could not be passed consistently. With regard to (c), EHC's with heater strips longer than about 7" have generally not passed the Hot Shake Test. Resistance that is too low caused one or more of the following problems: (a) the battery becomes unacceptably large and expensive; (b) the EHC has to be made with longer heater strips which have a tendency to fail the Hot Tests.

Prior structures, such as that described in U.S. Pat. No. 4,928,485 have had all of the corrugated thin metal heater strip members connected in a manner such that all of the strips extended spirally outwardly from a central electrode to a circular shell which served as the electrode of opposite polarity. The strips serve as heaters for the core. For automotive purposes, terminal resistance must be of sufficient magnitude to limit the power to 2.0 KW or less at a terminal voltage of 7.0 volts. This power level cannot be achieved conveniently when all of the heater strips are of a desirable length for such construction, e.g., about 6.6", and connected in parallel.

It has now been found that the internal resistance of the core can be increased substantially by increasing the length of the individual core elements hereinafter called "heater strips," without increasing the honeycomb core diameter, by folding groups of heater strips over centrally located rigid posts and then spirally winding the assembly with insulation tape on either side of each group. The heater strips of the present invention must be nonnesting or spaced apart to permit the flow of exhaust gas over spaced catalyst bearing surfaces. Thus, the heater strips may be flat strips spaced, for example, as described in U.S. Pat. No. 4,942,020 dated Jul. 17, 1990 to Cornelison et a¹, or corrugated so as to be nonnesting, e.g., in a herringbone pattern. The middle portion of the heater strips must be flat. The free ends of the core elements, or heater strips, are connected to a segmented retaining shell, one segment or connector plate, being attached to one side of a voltage source, and another segment or connector plate being attached to the other side of the voltage source. The retainer shell segments are connected in series through the heater strips. In preferred embodiments, there are two folded over groups of strips, each group bent around a centrally located rigid central post. A U-shaped pin, not unlike a cotter pin, may be used for this purpose. Each "group" may comprise a single corrugated thin high temperature resistive metal alloy heater strip, say 13 inches long, or 2, 3, 4, or more such strips in laminar relation. The strips are preferably corrugated in such a manner as to be nonnesting, or the strips may be arranged with a corrugated strip alternating with a flat strip of substantially equal length to avoid nesting. One end of each member of a group of thin high temperature resistive metal alloy heater strips is electrically secured to one retaining shell segment, and the other end of each member of a group of thin high temperature resistive metal alloy heater strips is electrically secured to another retaining shell segment.

In the following description, reference will be made to "ferritic" stainless steel. A suitable formulation for ferritic stainless steel alloy is described in U.S. Pat. No. 4,414,023 to Aggen data Nov. 8, 1983. A specific ferritic stainless steel useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. Another metal especially useful herein is identified as Haynes 214 alloy which is commercially available. This alloy is described in U.S. Pat. No. 4,671,931 dated Jun. 9, 1987 to Herchenroeder et al. This alloy is characterized by high resistance to oxidation. A specific example contains 75% nickel, 16% chromium, 4.5% aluminum, 3% iron, optionally trace amounts of one or more Rare Earth metals except yttrium, 0.05% carbon, and steel making impurities. Ferritic stainless steel (commercially available as Alfa IV from Allegheny Ludlum Steel Co.) and Haynes 214 alloy are examples of high temperature resistive, oxidation resistant metals that are suitable for use in making heater strips for EHC cores hereof. Suitable metals must be able to withstand temperatures of 900 C. to 1100 C. over prolonged periods.

Other high temperature resistive, oxidation resistant metals are known and may be used herein. For automative applications, for example, the thickness of the metal foil heater strips is in the range of from 0.0015" to 0.003", preferably 0.0016" to 0.002".

In the following description, reference will also be made to fibrous ceramic mat, woven fabrics, or insulation. Reference may be had to U.S. Pat. No. 3,795,524 dated Mar. 5, 1974 to Sowman and to the U.S. patent to Hatch U.S. Pat. No. 3,916,057 dated Oct. 28, 1975 for formulations and manufacture of ceramic fiber tapes and mats useful herein. One such woven ceramic fiber material is currently available from 3-M under the registered trademark "NEXTEL" 312 Woven Tape useful for isolating the respective groups of strips as described below. Ceramic fiber mat is available as "INTERAM" also from 3-M.

BRIEF STATEMENT OF THE INVENTION

Briefly stated, the present invention is an electrically conductive thin high temperature resistive, oxidation resistant metal honeycomb body having a number of nonnesting or spaced thin high temperature resistive, oxidation resistant metal heater strips extending in electrical parallel between electrically isolated connector plates. A stack of said thin metal heater strips is gathered at the flat or flattened midsections thus dividing the stack into two equal parts. Groups of one or more heater strips with the flat or flattened midsections and insulated on either side of the group, are firmly held between two rigid central posts or pins and the whole simultaneously spirally wound about the central pins, the part of the stack on one side of the pins being, in effect, bent in one direction about one of said rigid posts and the other part of the stack being bent in an opposite direction about another of said rigid posts. The groups are divided into first and second parts by the flat midsection portions. The rigid posts are thus centrally located in the honeycomb body. Insulation means, preferably in the form of woven ceramic tape commercially available as "Nextel" Woven Tape from 3-M, are provided between the first and second parts. The flexible woven ceramic tape may be long enough to extend outside of the core body through the space between the connector plates and wrapped around the entire assembly to provide the insulation means 142 (FIG. 4) between the core and the housing as later described. The connector plates define a segmented retaining sheel about said body, and the free ends of the thin metal heater strips are attached, for example, as by brazing or welding, to the connector plates. Means are provided for selectively electrically connecting the individual connector plate segments to a voltage source whereby current may flow from one connector plate through said thin metal alloy heater strips to another connector plate thereby effecting heating of the heater strips. No welding of the strips to the rigid central post or pins is required. It is, however, desirable to crush any corrugations in the central portion, or midsection, of the individual strips or otherwise provide a flat central portion of each heater strip, for example, by roll-forming.

In a specific embodiment, each thin metal alloy heater strip is formed from Haynes 214 as described above, is 13.0" long, 1.72" wide and 0.002" thick with a 0.5" folded over hem defining the leading edge, or upstream edge. The core is made up of 7 corrugated strips. Each strip is precoated with a 75% gamma alumina/25% ceria coating applied as a washcoat and calcined, has a platinum/rhodium catalyst deposited thereon, and has a resistance of 0.194 ohms. The central portion of a corrugated thin metal strip is flat or crushed to a flattened condition, and the ends are rendered free of refractory metal oxide coating so as to permit brazing or welding. The corrugations have an amplitude of from 0.02" to 0.09", e.g., 0.025" and a pitch of from 0.08" to 0.18", e.g., 0.126". The cross-sectional shape of the corrugations may be triangular, truncated triangular, triangular with the apices rounded (preferred), wave like, e.g., sinusoidal, etc. The pattern is desirably herringbone or chevron with sides having a slope of from 3 degrees to 20 degrees, for example, 16 degrees, to a line perpendicular to the edges of the thin metal alloy foil strip. Alternatively, for lower pressure drop through the device, the pattern of corrugations may be straight-through corrugations backed up with a thin flat plate, or straight-through variable pitch pattern such as described in U.S. Pat. No. 4,810,588 dated Mar. 7, 1989 to Bullock. The individual corrugated strips in the present invention do not require being backed up with a thin flat strip to prevent nesting which increases cost, or do they require interleaf brazing which also increases cost. This latter expedient may be used, however, if desired.

A preferred form of rigid central post or pin structure is generally and desirably U-shaped, preferably in the form of a large cotter pin, having two legs of half-round steel, nickel, or stainless steel, and an eye at one end. The eye is dimensioned to accept a transverse bar 3/16" to ⅜" in diameter, e.g., 5/16" for extending across the spirally wound core on the downstream side to provide stability against telescoping of the core in use. The generally U-shaped central post or pin is welded to the transverse bar which is, in turn welded to an outer metallic housing (not the retaining shell segments) as will be described below.

BRIEF DESCRIPTION OF THE DRAWINGS

The invention may be better understood by having reference to the annexed drawings showing a preferred embodiment of the invention and wherein:

FIG. 5 is a diagrammatic and schematic electrical diagram showing the parallel arrangement of the corrugated thin metal alloy strips and the connector plates through which power is supplied.

DETAILED DESCRIPTION OF THE INVENTION

Figure 1:
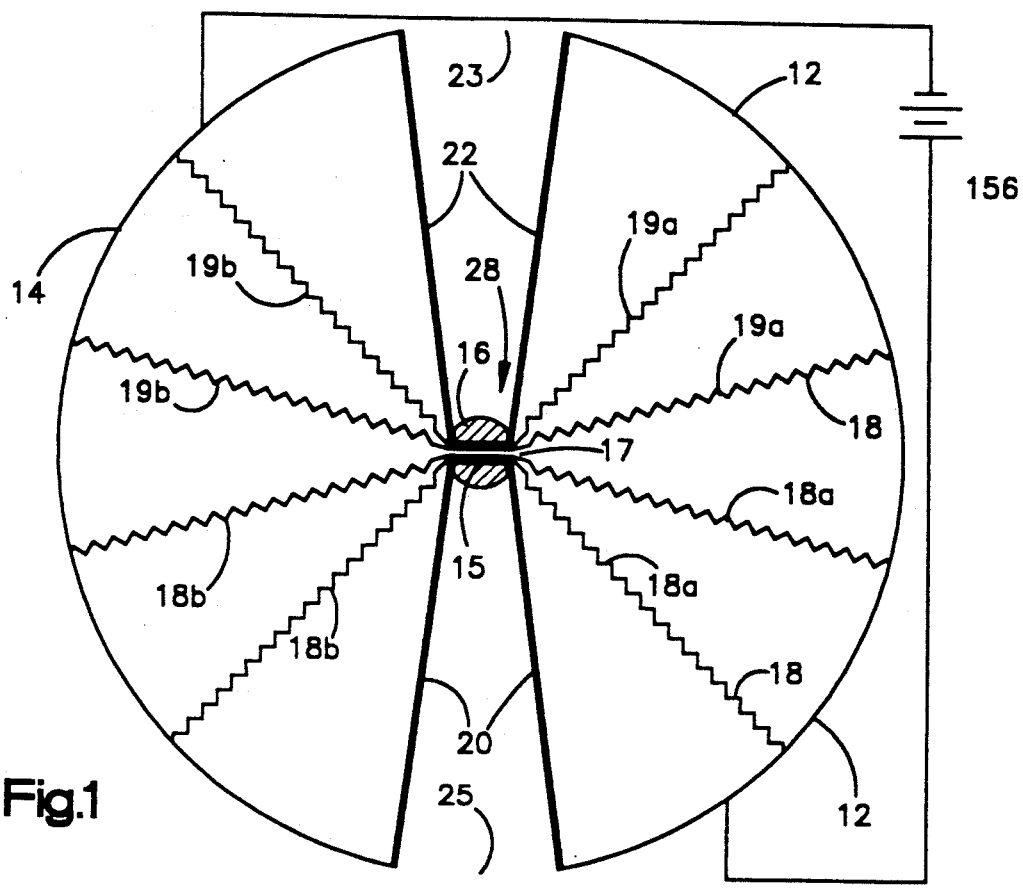
FIG. 1 is a diagrammatic end view of a core of the present invention prior to spirally winding the heater strips and insulation about the central pins.

As indicated above, the present invention provides a convenient means for increasing the internal resistance of a core for an electrically heatable catalytic converter (hereinafter EHC) and thus reducing the power required by the device to heat the core to a predetermined temperature in the range of from about 620 F. to about 680 F., e.g., 650 F. In a preferred embodiment, a corrugated thin high temperature resistive, oxidation resistant, alloy metal, e.g., a nickel/chromium/aluminum/iron alloy strip, is provided which is 13 inches long by 1.72" wide with a 0.5" folded over hem on the leading or upstream edge. The central portion is flat for about 0.25" to about 0.38" either side of the midpoint as shown, for example in FIG. 8. The resistance of each strip in such preferred embodiment is about 0.194 ohms. This is about twice the resistance of each strip in a case where the strips are welded to a central post and brazed to an outer shell segment as described in co-pending, commonly owned U.S. patent application Ser. No. 787,861 filed Nov. 5, 1991 by Cornelison et al now U.S. Pat. No. 5,140,812. In that case, increased internal resistance is obtained by placing a plurality of subcircuits of parallel connected relatively shorter corrugated thin metal strips in series, and wherein the strips are electrically connected between an outer shell segment and a rigid inner central post or central post segment. In the present case, a plurality of thin metal heater strips are electrically connected at one end to one segment of an outer retaining shell and at the other end to a different outer shell segment, with the midpoints of the strips being flat or flattened and tightly gathered and folded about two or more rigid central posts or pins in the course of simultaneously spirally winding the assembly. Insulation means, e.g., woven ceramic fiber cloth, is provided between the strip parts on one side of the central pin, and the strip parts on the other side of the pin because the voltage difference may be as high as 6 to 8 volts, enough to cause interlaminar arcing. However, the potential difference between the separate contiguous heater strips is so low that the refractory metal oxide coating provides sufficient insulation to prevent arcing. Both sides of the thin heater strips that are exposed to exhaust flow are coated with catalyst material. The present invention is an improvement over the prior invention in that welding of the heater strips to a central post is avoided and cost is thus reduced. Devices of the present invention are very durable and will withstand the Hot Shake Test and the Hot Cycling Test.

In the preferred embodiments of this invention, the heater strips are corrugated high temperature resistive, oxidation resistant metal alloy foil, especially a nickel-/chromium/aluminum/iron alloy or other "super" alloys containing aluminum (e.g., Haynes 214), precoated with a thin coating of a refractory metal oxide, e.g., gamma alumina-containing refractory metal oxide, and conventional catalytic materials prior to being cut to length. The corrugated strips can be formed according to the process described in the aforesaid U.S. Pat. No. 4,711,009, omitting, however, the creasing and accordion folding steps described in said patent, and substituting strip measuring and cutting steps. In the heater strip manufacturing process, means are provided for flattening the central portion of the strip and for removing the oxide coating on the ends of the strip length, e.g., by wire brushing, so that the strip ends can be brazed or welded to a retaining shell segment. Attachment of the flattened middle portion of the individual strips between the legs of the rigid central reinforcing post or pin as by welding is not required in the present case thereby effecting considerable cost reduction. The groups of foil strips along with flexible woven ceramic fabric strips to isolate groups attached to one connector plate from those attached to another connector plate, are tightly spirally wound about the rigid central post. Attachment of the free ends of the corrugated foil heater strips to the outer retaining shell segments is conveniently done by welding or by applying thin sheets of brazing foil (such as a nickel-chromium-silicon-boron alloy "50/50A" or "80/80A" commercially available from Allied Metglas Products, Parsippany, N.J. 07054) to the group of foil ends requiring attachment to a given retaining shell segment. The shell segments are clamped around the spirally wound assembly in the proper positions and the assembly is peripherally fastened together by welding or brazing.

It is a distinct advantage to the present invention that "precoated" thin metal foil heater strips can be made in accordance with the process of the aforesaid U.S. Pat. No. 4,711,009. This avoids a "post coating" process where the core, preferably before spirally winding, is dip coated in a washcoat containing alumina or other refractory metal oxide, or a mixture of refractory metal oxides, and calcined, subsequent to which the noble metal catalyst is applied by dip coating followed by another calcining step. While "post coating" can be done in making the cores hereof, "precoating" with a refractory metal oxide and catalyst is preferred. A thin coating, e.g., 0.0005" to 0.0010", of a refractory metal oxide, e.g., 75% gamma alumina/25% ceria, applied by washcoating and calcining, serves as a dielectric to prevent short circuiting between contiguous heater strips connected in parallel.

It becomes convenient at this point to refer more particularly to the annexed drawings. FIG. 1 is a diagrammatic representation of a core of this invention prior to spiral winding, showing the relationship of corrugated heater strips 18 composed of parts 18a and 18b, and 19a and 19b, and wherein each heater strip 18 passes through the gap 17 between the legs 15 and 16 of the rigid central post or pin generally indicated at 28.

The woven ceramic fiber insulating strips 20 and 22 isolate the corrugated strips 18 from the central legs 15 and 16, respectively, of the rigid bifurcated pin 28 and the otherwise contiguous parts 18a and 18b and the otherwise contiguous parts 19a and 19b, which contiguous parts are at sufficiently different potentials to cause arcing. As shown in FIG. 1, each corrugated strip 18 of a group of four such strips is connected at one end to a circular section plate 12, or connector plate 12, passes through the gap 17 and has its opposite end attached to a circular section plate 14, or connector plate 14. The circular section connector plates 12 and 14 are each less than 180 degrees thereby creating axially extending gaps 23 and 25 through which the woven ceramic tapes 20 and 22 may pass. The connector plates 12 and 14 serve as a segmented retainer shell about the spirally wound core 10 in which the respective connector plates 12 and 14 are electrically isolated from one another.

Figure 2:
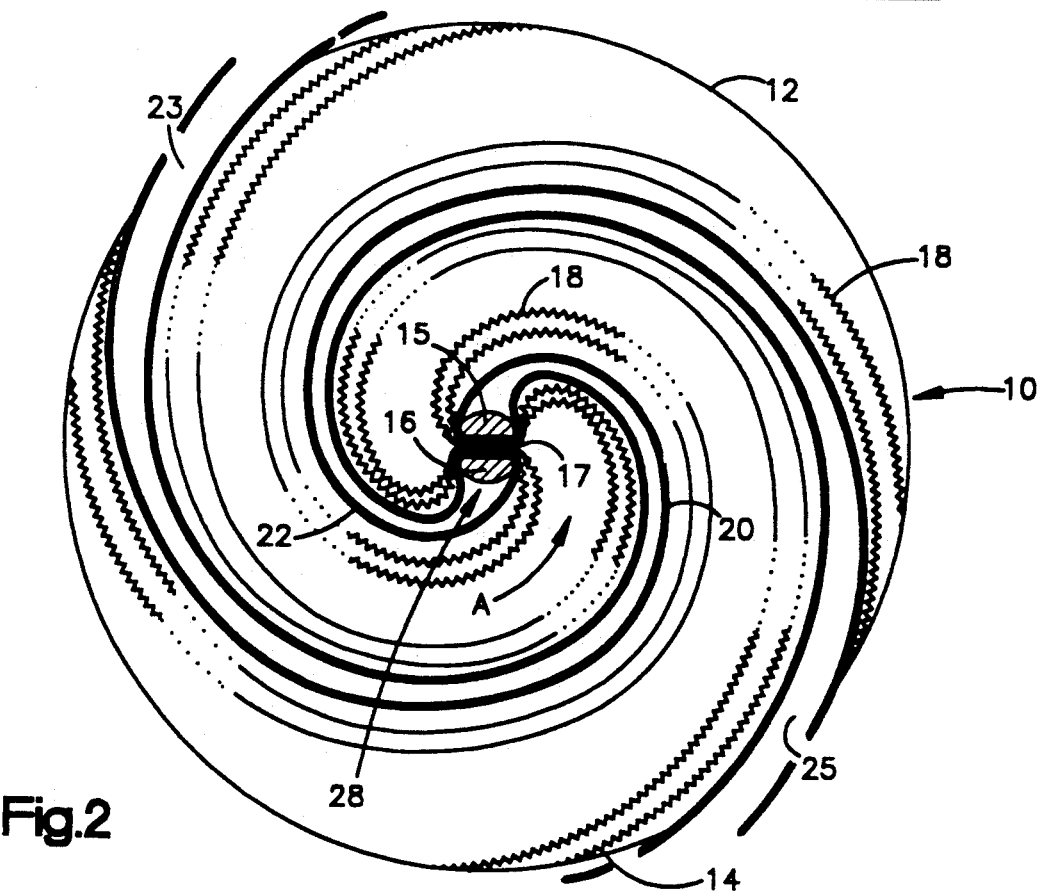
FIG. 2 is an end view of a core of the present invention showing the spiral winding. For clarity, the spiral winding is not shown as it would be if tightly wound and the corrugated parts and insulation strips were in contiguous relation.
Figure 3:
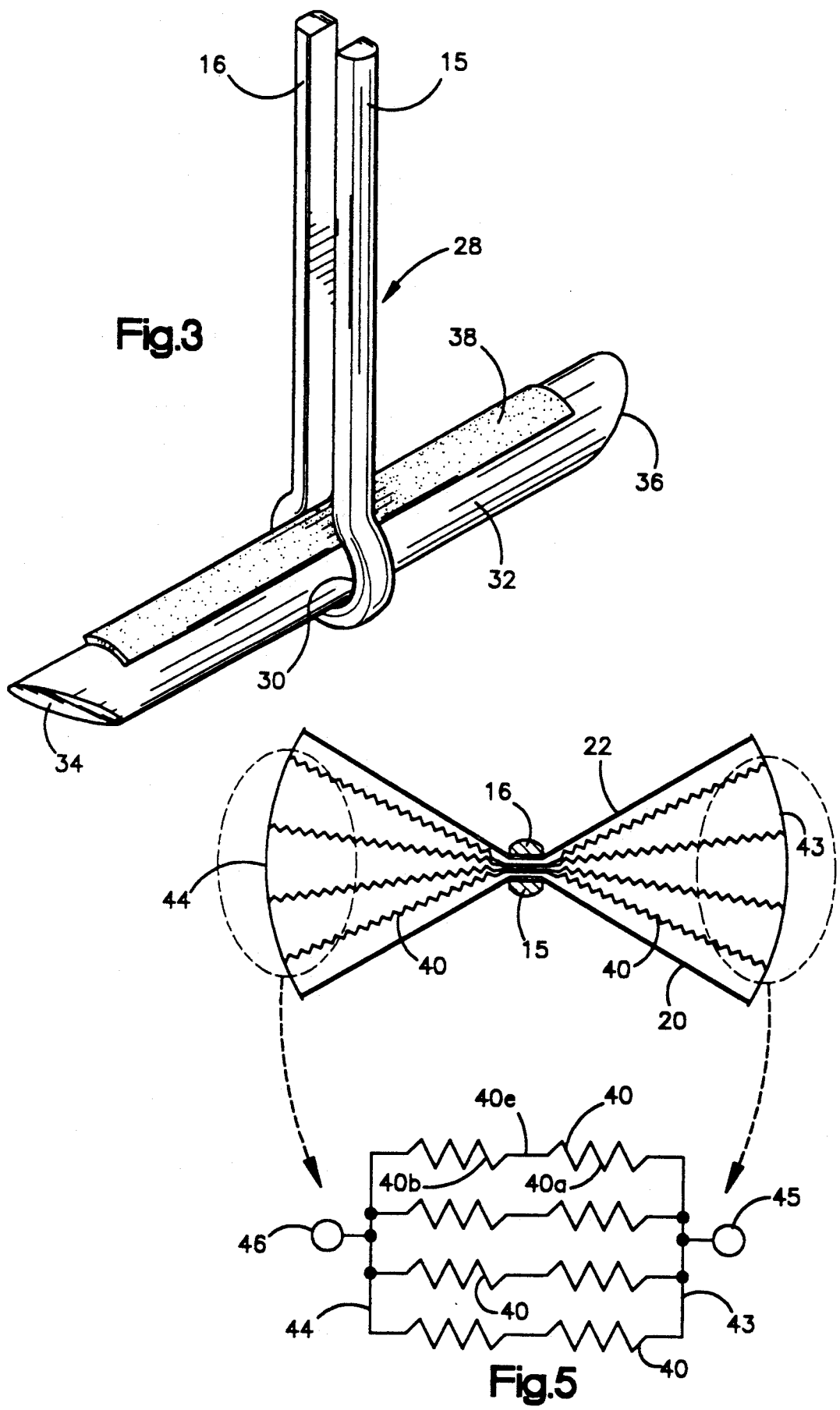
FIG. 3 is a perspective view of a rigid central post or pin structure in the form of a cotter pin having an insulated transverse retaining bar in the eye.

FIG. 2 is a diagrammatic end view of a spirally wound honeycomb core 10 having a pair of circular retaining shell segments 12 and 14 and a rigid central bifurcated post or pin generally indicated at 28, e.g., a cotter pin 28. Corrugated thin metal alloy heater strips 18 extend between an outer shell segment. e.g., segment 12, with the flat portion 40c (FIG. 8) passing through the gap 17 between the bifurcated legs 15 and 16, and then to the other outer shell segment 14. From 1 to 48 strips may follow such a path. Thus, in a two leg central member as shown in FIGS. 1-3, all the strips pass through the gap 17 and are connected in electrical parallel between the outer shell segments 12 and 14. Woven ceramic fabric strips 20 and 22 electrically isolate the flat middle portions of the parallel connected strips from the rigid central pin legs 15 and 16 to prevent short circuiting, and otherwise contiguous foil parts, e.g., parts 18a and 18b, and parts 19a and 19b, at relatively high potential difference to prevent arcing. The flat middle sections 40c (FIG. 8) retain their refractory metal oxide coating on both sides along with the corrugated parts of the strip. The contacting or contiguous strips 18 attached to the same connector plate, e.g., connector plate 12, are insulated from each other by the refractory metal oxide coating on the surfaces of the strips 18. Arcing is not a problem because the potential difference at the points of contact of contiguous strips is very low, i.e., generally less than 1 volt. The outer ends of the corrugated parts have the refractory metal oxide coating removed, as by wire brushing, to enable welding or brazing. The refractory metal oxide coating may be absent because of the use of a mask or masking agent. It is a matter of choice whether to clean the ends of the heater strips before assembly with the legs 15 and 16 of the rigid central pin 28, or after spirally winding the assembly, and prior to attachment of the connector plates 12 and 14, or retaining shell segments 12 and 14. The arrow A in FIG. 2 indicates the counterclockwise direction of rotation of the central post 28 to effect spiral winding of the core. In actual practice, the corrugated strips 18 are nonnesting, contiguous and tightly wound instead of slightly spaced as shown for clarity in FIG. 2. The corrugated thin metal strips desirably have a refractory metal oxide coating, e.g., gamma alumina/ceria, on at least one side, preferably both sides, with a noble metal catalyst, e.g., platinum/rhodium, deposited thereon.

Figure 4:
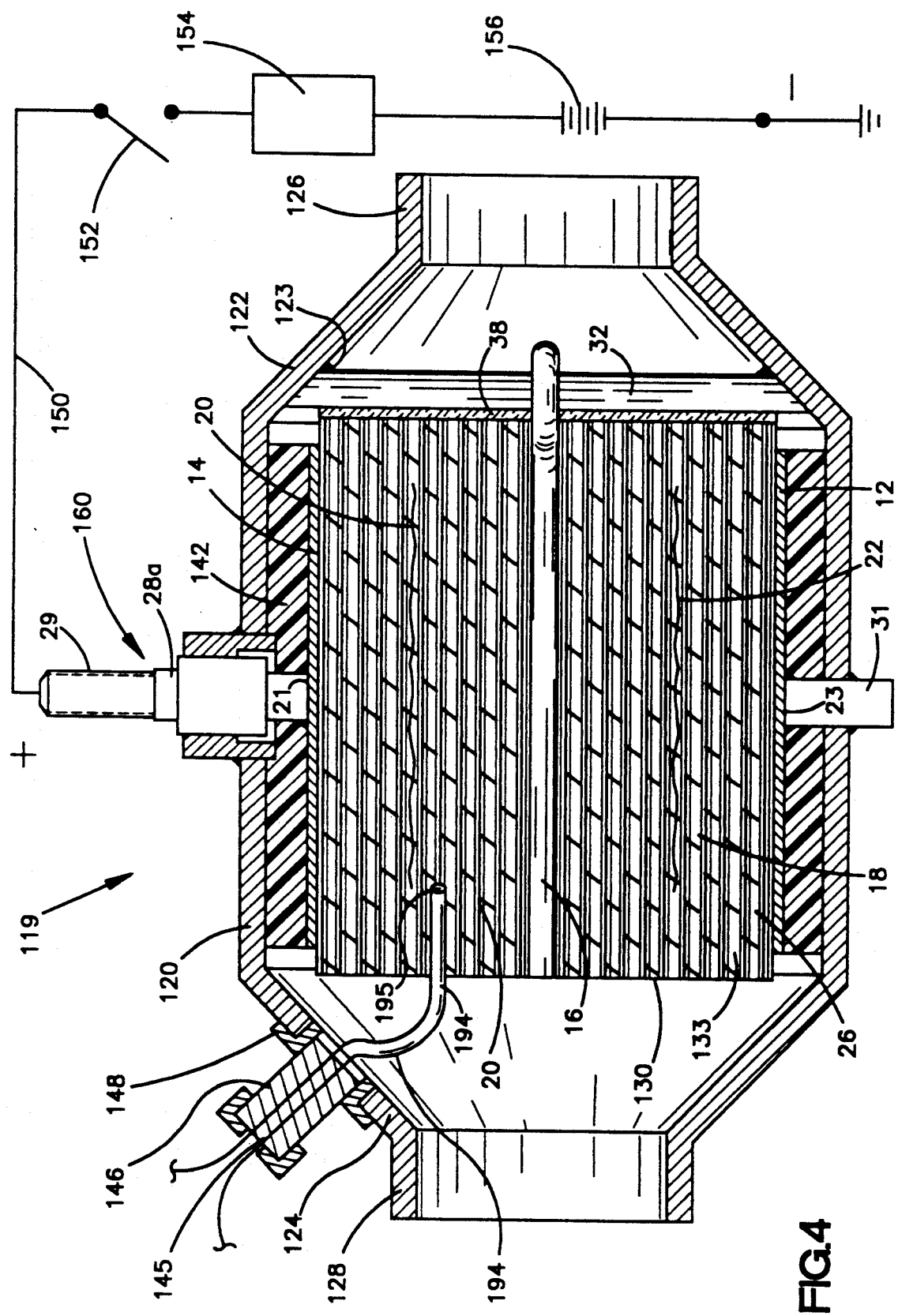
FIG. 4 is a cross-sectional view of an electrically heatable catalytic converter having the core of FIG. 2 contained therein, and showing the attachment to a voltage source.

FIG. 3 shows a subassembly of a rigid bifurcated center post or pin generally indicated at 28 having two legs 15 and 16. An eye 30 is provided to accept a diametrally (with respect to the spirally wound core) extending bar 32 in a slip fit. The T-shaped combination of the bar 32 and the pin 28, the eye 30 of which is welded to the bar 32, provides a convenient structure for resisting telescoping of the core when undergoing the "Hot Tests" or in actual use. The ends of the bar 34 and 36 may be conveniently shaped to fit within a housing 120 shown in FIG. 4, and also as shown in FIG. 4, are welded to the inside of the housing 120. To prevent shorting across the ends of the corrugated thin metal strips, e.g. strips 18, the bar 32 (which is in contact with the spirally wound core 10 on the downstream end) is provided with an insulating strip, such as, a refractory metal oxide coating strip 38, for example, a plasma spray applied magnesium zirconate coating strip, or alumina coating strip, or zirconium oxide coating strip, or titania coating strip, etc. The coating must adhere to the bar 32 and withstand temperatures of from 1500 F. to 2100 F. (815 C. to 1150 C.) This is sufficient to prevent shorting across the downstream edges of the corrugated strips with which the bar 32 is in contact. The rigidity of the structure of the bar 32, the pin 28, the abutment of the bar 32 with the ends of the core 10 and the weldment 123 to the end cap 122 (FIG. 4) for example, prevents core destructive telescoping in the course of the Hot Tests described above.

FIG. 4 is a cross-sectional view of a fully assembled EHC 119 utilizing a core of the present invention, such as that shown in FIG. 2 with a support structure such as that shown in FIG. 3 on the downstream end of the core 130. The core 130 is diagrammatically shown in FIG. 4. This assembly may be inserted in the exhaust line of an internal combustion engine. The converter 119 is provided with a stainless steel housing 120, e.g., #304 or #409 stainless steel, or alloy metal, having flared end caps 122 and 124, and nipples 126 and 128 integral therewith. The nipples 126 and 128 are dimensioned to accommodate a vehicle exhaust pipe, e.g., a 2.5" ID pipe. The housing 120 contains an electrically heatable catalytic converter core 130, e.g., that shown in FIG. 2. The honeycomb core 130 of FIG. 4 is defined by a plurality of generally axially extending cells 133, diagrammatically shown in FIG. 4 as a plurality of parallel lines with a rigid post or pin leg 16 extending axially therethrough, and insulator strips 20 and 22. The honeycomb core 130 is permeable to exhaust gas and, as indicated above, is formed of a plurality of corrugated high temperature resistive, oxidation resistant, thin metal alloy foil heater strips 18 (FIG. 1) with woven ceramic tape strips 20 and 22 in place. The middle portions 40c (FIG. 8) of the corrugated thin foil heater strips 18 are gripped by the legs 15 and 16 of the rigid central post 28 along with the insulation strips 20 and 22. The legs 15 and 16 form a couple which facilitates tight spiral winding of the core. The electrical terminal 160 is insulated from and extends through the housing 120 by a plasma applied refractory metal oxide coating, e.g., magnesia/zirconia or alumina coating 29a. Terminal 31 also extends through the housing 120 but need not be insulated therefrom. Both terminals 160 and 31 are suitably connected to a power source 156 through a suitable power switching device 154 (See Ser. No. 524,284 filed Apr. 16, 1990 by W. A. Whittenberger) by cable 150 and switch 152. The core assembly 130, such as shown in FIGS. 1 and 2, is wrapped in a flexible woven ceramic fiber insulation 142, (NEXTEL) desirably 1/16" to ⅛" thick, which may be extensions of the woven tape from within the core, or wrapped in a flexible ceramic felt (INTERAM) of about the same thickness, and inserted into the housing 120. A suitable ceramic felt is described in the U.S. patent to Hatch U.S. Pat. No. 3,916,057 dated Oct. 28, 1975. The insulation 142 electrically isolates the core 130 from the housing 120. At the time the housing half shells (which is the most convenient way of surrounding the core 130 with the housing 120) are applied and the insulation 142 is in place, it is desirable to cement very thin foil sections (not shown) to the outer surface of the insulation 142 in the region where the half shells mate. This is to prevent ceramic fibers from the insulation 142 from being pinched between edges of the half shells of the housing 120. These foil sections serve no other purpose in the devices hereof. The end caps 122 and 124 are the last parts to be attached as by seam welding. Optionally, a thermocouple 194 having a junction 195 may be placed in the core 130 to sense temperature. The leads of the thermocouple 194 pass through an insulator 146, preferably a ceramic sleeve, and a bushing 148 extending through the end cap 124 and provide a signal for actuating and disabling the flow of current from the battery 156. The projecting stud 29 of the terminal feed through 160 is desirably threaded to accept a nut, or a pair of nuts, (not shown) to hold a cable connector from cable 150 extending from the positive pole of the battery 156 as above indicated. The inner end of 29b of the terminal 29 is welded to the connector plate 14, or shell segment 14. The negative pole of the battery, which may be a 12 volt, 24 volt or 48 volt battery, for example, may be attached to the terminal 31 as indicated above for the terminal 160, or indirectly attached to the terminal 31 through the chassis of the vehicle which, in turn, is attached to the battery by a ground strap. The inner end 23 of the terminal 31 is welded to the opposite connector plate 12, or shell segment 12.

The cell density of the core 130 is conveniently in the range of 80 to 350 cells per square inch, preferably from 100 to 180 cells per square inch, and specifically 160 cells per square inch.

While the catalytic converters hereof may be built without electrical conduction paths and without insulation and used without electrical heating, the preferred embodiments are "electrically heatable." This is to indicate that power is supplied to the converter on demand from the time of engine start-up, and possibly prior to engine start-up, or at any time the temperature is sensed to be below a predetermined set point.

FIG. 5 shows in electrical schematic form the parallel/series arrangement of the heater strips 40. Each heater strip 40 may be viewed as two corrugated parts 40a and 40b connected in series by a flat portion 40c. Each heater strip 40 is secured in parallel, as by welding or brazing, to a connector plate 43 and through it to a terminal 45 at one end, and to a connector plate 44 and through it to a terminal 46 at the other end. Connector plates 43 and 44 correspond to the retaining shell segments 12 and 14, respectively, in FIGS. 1, 2 and 4, and terminals 45 and 46 correspond to the terminals 160 and 31 in FIG. 4. The retaining shell segments, for example segments 12 and 14 in FIG. 2, are twice split, or separated from one another at two points in an axial direction because of the incomplete circular extent of the retaining shell segments 12 and 14 and the need to keep the segments 12 and 14 electrically isolated from one another.

Figure 8:
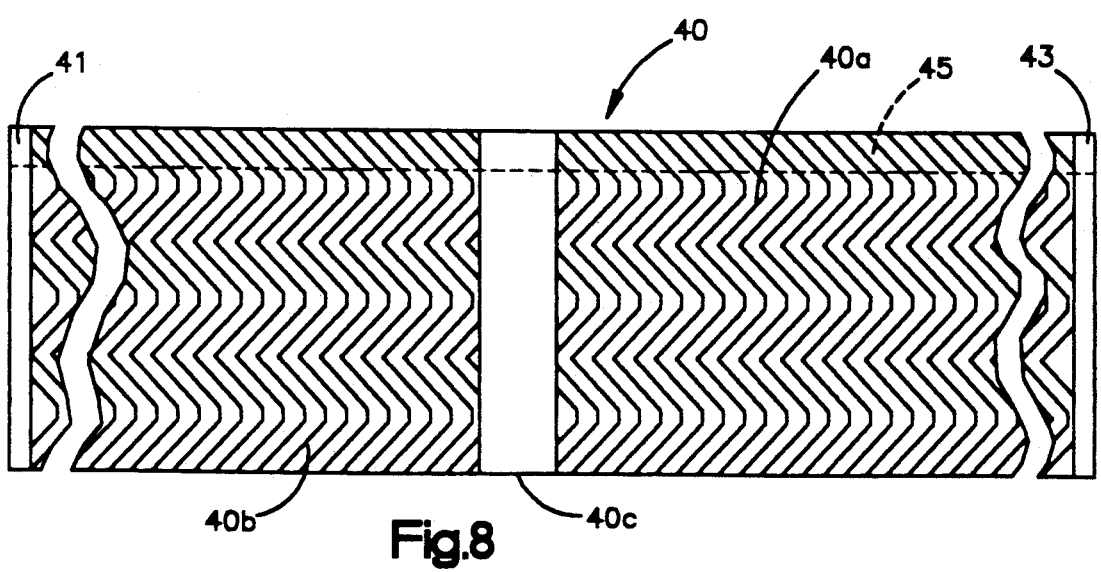
FIG. 8 shows a corrugated thin metal strip having a truncated herringbone pattern and having the central portion flattened.

As best shown in FIG. 8, each heater strip 40 has a corrugated part 40a, a flat section 40c, and a second corrugated part 40b. The ends 41 and 43 are also flat and are cleaned, as by wire brushing, to be free of any refractory metal oxide coating. The ohmic resistance of each alloy metal (e.g., Haynes 214) heater strip 40 (including parts 40a and 40b) in a preferred case, is 0.194 ohms. Each heater strip is about 13.0" long by 1.72" wide by 0.002" thick desirably, albeit not essentially, with a 0.5" folded over hem 45 on the leading or upstream edge. The corrugations, in a preferred case, are truncated herringbone having an amplitude of from 0.04" to 0.09", e.g., 0.050" and a pitch of from 0.08" to 0.18", e.g., 0.126". The cross sectional shape of the corrugations may be triangular, truncated triangular, triangular with the apices rounded (preferable), wavelike, e.g., sinusoidal, etc. The pattern is desirably herringbone with the sides having a slope of from 10 degrees to 20 degrees, e.g., 16 degrees, to a line perpendicular to the edges of the corrugated strip, and desirably a truncated shape in plan view. Thus, the heater strips 40 are connected in parallel between the connector plates 43 and 44 (FIG. 5) and the corrugated parts 40a and 40b are in series.

Figure 6:
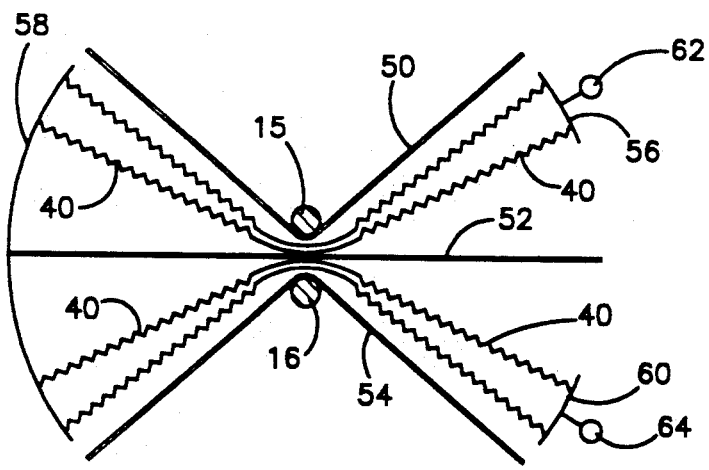
FIG. 6 is a diagrammatic sketch showing the arrangement with two groups of heater strips connected in series.
Figure 7:
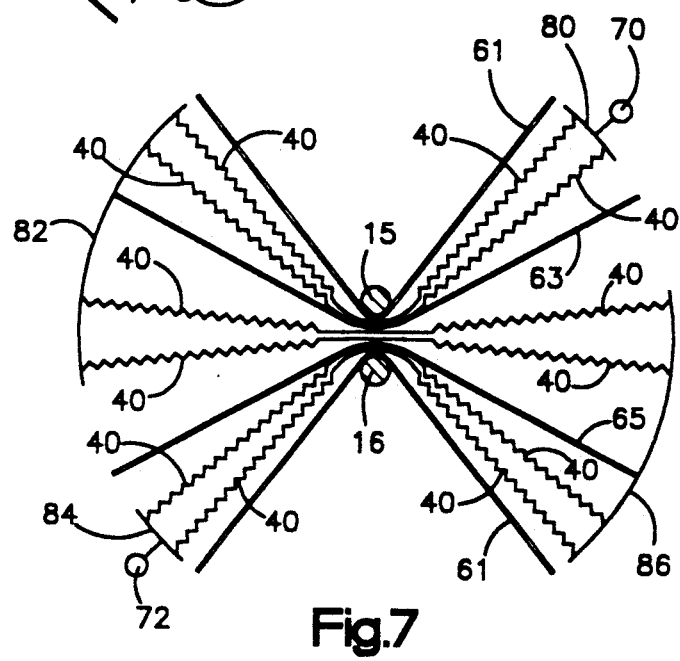
FIG. 7 is a diagrammatic sketch showing the arrangement with three groups of heater strips connected in series.

Instead of one group of 4 parallel connected heater strip portions as shown in FIGS. 1-2, and 5 there may be 2 groups of two strips 40 each as shown in FIG. 6 or 3 groups of two strips 40 each as shown in FIG. 7. One or more, up to 48, preferably 2 to 8, of the flat portions of the heater strips, e.g., flat portion 40c in FIG. 8, are collected between one or more pairs of rigid structural support posts or pins 15 and 16, along with insulation strips 50, 52 and 54 (FIG. 6), and 61, 63, 65 and 67 (FIG. 7) represented by double lines in both FIGS. 6 and 7, etc. and the entire assembly tightly spirally wound about the legs 15 and 16 to provide the basic assembly. Separate retaining shell segments 56, 58 and 60 (FIG. 6) and shell segments 80, 82, 84 and 86, are provided for opposite ends of each group of heater strips 40, as shown in FIG. 7. The segments are all connected in series by the heater strips 40 and one end of the series connected at 70 to one pole of a voltage source and the other end of the series connected at 72 to the other pole of the voltage source, as indicated above. The current paths in FIG. 6 may be traced from the terminal 62 through the connector plate or shell segment 56 through the corrugated strip 40 to the connector plate or shell segment 58 back through another group of strips 40 to the connector plate or shell segment 60 and to the terminal 64. The current paths in FIG. 7 can be traced from the terminal 70 through the shell segment 80 to the corrugated heater strips 40 to the shell segment 82 back through another pair of corrugated heater strips 40 to the shell segment 86 and back through yet another pair of heater strips 40 to the shell segment 84 and to the terminal 72.

Many applications, especially those involving automotive applications, require EHC's rated at 1.5 to 2.0 KW, which, at a nominal terminal voltage of 7 volts (12.0 volts nominal electrical system after allowance for voltage drop) can be calculated to be 0.033 to 0.025 ohms according to the equation:

$$R = E^2/P$$

where R is the terminal resistance of the EHC, E is the voltage available to the EHC terminals, and P is the power consumption.

Automotive applications, for example, for EHC's starting in about the year 2000 and beyond, are likely to standardize on higher system voltages. For example, 48 volt automotive and truck systems will likely be common. For a given power output, an EHC's design resistance needs to be increased as a function of the square of the increase in the terminal voltage according to the equation given above. For example, EHC's rated at 1.5 and 2.0 KW would require that the resistance be in accordance with the following Table I.

TABLE I

| EHC TERMINAL RESISTANCE REQUIRED FOR VARIOUS VOLTAGES | | | | | | |
|---|---|---|---|---|---|---|
| | 2.0 KW | | | 1.5 KW | | |
| System Voltage Rating | 12 | 48 | 96 | 12 | 48 | 96 |
| Voltage at EHC Terminals | 7 | 43 | 91 | 7 | 43 | 91 |
| Terminal Resistance, Ohms | .025 | .925 | 4.14 | .033 | 1.23 | 5.52 |

There has thus been provided an improved optionally, electrically heatable catalytic converter having a plurality of parallel connected corrugated thin metal strips with like parts being connected in series to provide a higher resistance at the EHC terminals for optimum heating characteristics and power requirements with a voltage source for from 12 to 48 volts, or higher. The device is also characterized by mechanical strength thereby enabling it to withstand the rigors of the Hot Tests described above.

What is claimed is:

1. An electrically conductive thin metal honeycomb body, said body comprising a spirally wound plurality of corrugated thin metal strips extending in electrical parallel between electrically isolated connector plates, each of said corrugated thin metal strips having a flat middle portion, a plurality of said corrugated thin metal strips located with each of the flat middle portions thereof positioned between a pair of rigid central posts; a first group of said corrugated thin metal strips being bent in one direction around one of said posts, and another group being bent in an opposite direction about the other of said posts; insulation means isolating said first and second groups from said posts, respectively, and electrically isolating said groups from each other, said connector plates defining a segmented shell about said body and means for connecting said electrically isolated connector plates in series to a voltage source whereby current may flow from one connector plate through said corrugated thin metal strips to another connector plate.

2. An electrically conductive thin metal honeycomb body as defined in claim 1 wherein the corrugated thin metal strips are a high temperature resistive, oxidation resistant metal alloy.

3. An electrically conductive thin metal honeycomb body as defined in claim 2 wherein the metal alloy is a stainless steel.

4. An electrically conductive thin metal honeycomb body as defined in claim 3 wherein the stainless steel is a ferritic stainless steel.

5. An electrically conductive thin metal honeycomb body as defined in claim 2 wherein the metal alloy is a chromium/nickel/aluminum/iron alloy.

6. An electrically conductive thin metal honeycomb body as defined in claim 1 wherein the thin metal strips are corrugated so as to be nonnesting.

7. An electrically conductive thin metal honeycomb body as defined in claim 6 wherein the corrugated thin metal strips are corrugated in a herringbone pattern.

8. An electrically conductive thin metal honeycomb body as defined in claim 6 wherein the corrugated thin metal strips are corrugated in a straight-through non-nesting pattern.

9. An electrically conductive thin metal honeycomb body as defined in claim 8 wherein the corrugations have a variable pitch.

10. An electrically conductive thin metal honeycomb body as defined in claim 1 wherein the corrugated thin metal strips are alternated with flat metal strips.

11. An electrically conductive thin metal honeycomb body as defined in claim 1 wherein the corrugated thin metal strips have a coating of a refractory metal oxide on at least one surface thereof.

12. An electrically conductive thin metal honeycomb body as defined in claim 1 wherein the corrugated thin metal strips have a catalyst on the surface thereof.

13. An electrically conductive thin metal honeycomb body as defined in claim 12 wherein the catalyst is a noble metal.

14. An electrically conductive thin metal honeycomb body as defined in claim 13 wherein the noble metal is selected from the group consisting of platinum, palladium, rhodium, ruthenium and mixtures of two or more of such metals.

15. An electrically conductive thin metal honeycomb body as defined in claim 1 wherein the pair of rigid posts is in the form of a cotter pin.

16. An electrically conductive thin metal honeycomb body as defined in claim 15 wherein each of said groups of corrugated thin metal strips is insulated from each said post, respectively.

17. An electrically conductive thin metal honeycomb body as defined in claim 15 having a transverse support bar extending normal to said pair of rigid central posts, said bar having an insulating coating thereon in contact with the ends of the spirally wound corrugated thin metal strips.

18. An electrically conductive thin metal honeycomb body as defined in claim 17 in which the insulating coating is a refractory metal oxide coating.

19. An electrically conductive thin metal honeycomb body as defined in claim 18 wherein the coating is a plasma spray coating.

20. An electrically conductive thin metal honeycomb body as defined in claim 18 wherein the refractory metal oxide coating is an alumina coating.

21. An electrically conductive thin metal honeycomb body as defined in claim 1 wherein the corrugated thin metal strips are a nickel/chromium/aluminum/iron alloy, the strips are corrugated in a herringbone pattern, the corrugated thin metal strips are coated on both sides with a refractory metal oxide coating and have a noble metal catalyst deposited on the surface thereof; the pair of central posts is in the form of a cotter pin, said cotter pin having an eye; a transverse support bar extending through said eye in contact with the downstream ends of said corrugated thin metal strips, and a plasma sprayed coating on said transverse bar to isolate said bar from the ends of said corrugated thin metal strips.

22. An electrically heatable catalytic converter comprising (1) housing, (2) end cap adapters for each end of the housing for adapting said converter for insertion in an exhaust line, (3) honeycomb body located in said housing and having an upstream end and a downstream end and comprising (a) a spirally wound plurality of corrugated thin metal strips extending in electrical parallel between electrically isolated connector plates, each of said corrugated thin metal strips having a flat middle portion, a plurality of said corrugated thin metal strips located with each of the flat middle portions thereof positioned between (b) a pair of rigid central posts; a first group of said corrugated thin metal strips being bent in one direction around one of said posts and another group of said corrugated thin metal strips being bent in an opposite direction about the other of said posts; (c) insulation means electrically isolating said first and second groups from contact with said posts, respectively, and electrically isolating said groups from each other; said connector plates defining a segmented retaining shell about said body in which the connector plates are electrically isolated from one another except through the corrugated thin metal strips; (d) a transverse bar extending across the downstream end of said body and in contact with the corrugated thin metal strips and welded to said housing, said bar being electrically isolated from said corrugated thin metal strips by having a coating of a refractory metal oxide on a surface thereof in contact with said corrugated thin metal strips; (4) insulation means disposed between the housing and said body; (5) at least one feed-through terminal extending through the housing secured to one of said connector plates for attachment to one pole of a voltage source; (6) a second feed-through terminal for attachment to the other pole of a voltage source extending through the housing and attached to another of said connector plates; and (7) a voltage source whereby electrical power may be selectively applied to the corrugated thin metal strips to effect heating thereof.

* * * * *